United States Patent
Del Ayre et al.

(10) Patent No.: US 10,977,169 B2
(45) Date of Patent: Apr. 13, 2021

(54) POINT OF SALE PLATFORM PROCESS CRAWLER

(71) Applicant: NCR Corporation, Atlanta, GA (US)

(72) Inventors: Edward John Del Ayre, Lapu-Lapu (PH); Baby Berdon Brigoli, Mandaue (PH); Christopher M. Tuburan, Mandaue (PH)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/231,024

(22) Filed: Dec. 21, 2018

(65) Prior Publication Data
US 2020/0201749 A1 Jun. 25, 2020

(51) Int. Cl.
*G06F 11/30* (2006.01)
*G06F 11/36* (2006.01)

(52) U.S. Cl.
CPC ...... *G06F 11/3692* (2013.01); *G06F 11/3086* (2013.01); *G06F 11/3684* (2013.01); *G06F 11/3688* (2013.01)

(58) Field of Classification Search
CPC ............. G06F 11/3664; G06F 11/3686; G06F 11/3688; G06F 11/3692
See application file for complete search history.

(56) References Cited

U.S. PATENT DOCUMENTS

| | | | | |
|---|---|---|---|---|
| 9,983,989 | B1* | 5/2018 | Li | G06F 11/3692 |
| 2008/0263505 | A1* | 10/2008 | StClair | G06F 8/10 |
| | | | | 717/101 |
| 2008/0304650 | A1* | 12/2008 | Catlin | H04M 3/24 |
| | | | | 379/298 |
| 2011/0161936 | A1* | 6/2011 | Huang | G06F 11/3688 |
| | | | | 717/130 |
| 2016/0299837 | A1* | 10/2016 | Browne | G06F 11/3692 |
| 2019/0213607 | A1* | 7/2019 | Eppley | G06F 16/904 |

OTHER PUBLICATIONS

Ali Mesbah, Engin Bozdag, Arie van Deursen, Crawling AJAX by Inferring User Interface State Changes, IEEE, 2008, retrieved online on Nov. 28, 2020, pp. 122-134. Retrieved from the Internet: <URL: https://ieeexplore.ieee.org/stamp/stamp.jsp?tp=&arnumber=4577876>. (Year: 2008).*

Mathias Schur et al., Mining Workflow Models from Web Applications, IEEE, 2015, retrieved online on Nov. 29, 2020, pp. 1-18. Retrieved from the Internet: <URL: https://ieeexplore.ieee.org/stamp/stamp.jsp?tp=&arnumber=7169616>. (Year: 2015).*

Charles Norman Macleod et al, Machining-Based Coverage Path Planning for Automated Structural Inspection, IEEE, 2016, retrieved online on Nov. 28, 2020, pp. 1-12. Retrieved from the Internet: <URL: https://ieeexplore.ieee.org/stamp/stamp.jsp?tp=& arnumber=7571164>. (Year: 2016).*

* cited by examiner

Primary Examiner — Hanh Thi-Minh Bui
(74) Attorney, Agent, or Firm — Schwegman, Lundberg & Woessner

(57) ABSTRACT

Disclosed are systems and methods for testing a plurality of process flows. The systems and methods may include executing a test narrative to test process flows. Once the test narrative is executed, a report card may be generated in accordance with the test narrative. A coverage map based on the report card may be displayed on a display.

9 Claims, 3 Drawing Sheets

POINT OF SALE PLATFORM PROCESS CRAWLER

SUMMARY

Disclosed are systems and methods for testing a plurality of process flows. The systems and methods may include executing a test narrative to test process flows. Once the test narrative is executed, a report card may be generated in accordance with the test narrative. A coverage map based on the report card may be displayed on a display.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
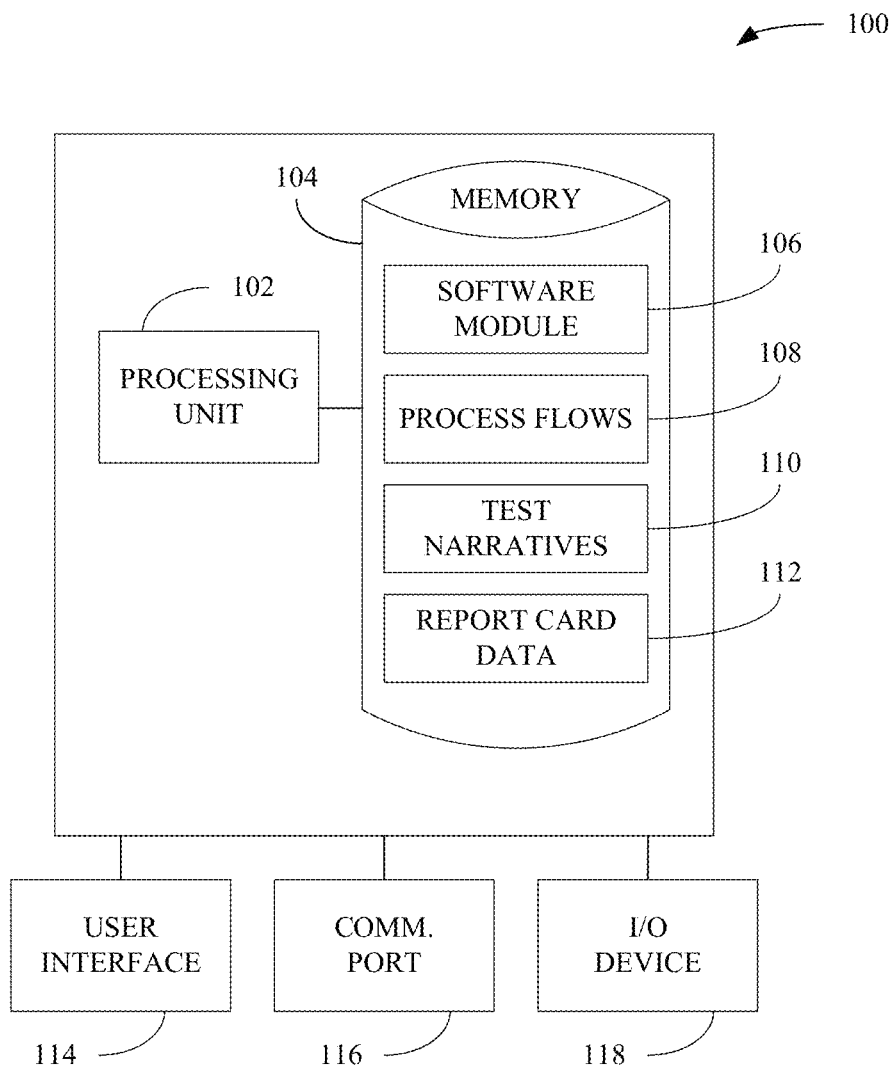
FIG. 1 shows an example schematic of an example system consistent with embodiments disclosed herein.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit this disclosure. Instead, the proper scope of any invention disclosed herein is defined by the appended claims.

Behavior driven development (BDD) is a concept in advanced store point of sale (POS) software development. POS platforms may have a BDD test framework, which may allow automation test scripts to run and verify their expected transitions. The systems and methods disclosed herein may allow a process control crawler (PCC) to bridge a gap in POS quality assurance measures by allowing a BDD test framework to identify and generate testing results to address BDD test coverage concerns and address quality assurance concerns. Realizing the actual test coverage using the systems and methods disclosed herein will allow for automation test scripts to be generated, which will ultimately lead to a better-quality product for the end customer. Stated another way, the systems and methods disclosed herein improve the functionality and reliability of POS platforms.

During operation POS systems may behave in different ways and be configured in multiple ways. For example, POS systems may have different configurations, parameters, and acceptance criteria. As a result, POS systems may need to be tested in a variety of manners. For instance, unit tests, scrum acceptance tests, regression tests, and automation tests may be performed on POS systems during the design and construction phases.

The systems and methods disclosed herein provide for early detection and early feedback system that will help report coverage metrics before unforeseen flows hit the customer's lab or the end user. The systems and methods disclosed herein may augment the gap in POS platform BDD testing by providing a tool that will help expose test coverage results of all business logic flows in the POS. This may allow for an actual comparative analysis between the existing test scripts versus the whole spectrum of business logic available in the product.

The systems and methods disclosed herein may include process flows to be created via a process control manager. Automation tools may be used to generate matching test narratives for the process flows. Automated developer integrated testing (DIT)/system integration testing (SIT) jobs may be run on every commitment a BDD report card may be generated. Coverage mapping and analytics report may be generated from the BDD report card.

The systems and methods disclosed herein improve the functionality and reliability of POS platforms through the use of a BDD test coverage to help ensure product quality and eliminate any subjective claims around test coverage and the notion of sheer number of test scripts versus test case ratio in the POS. Stated another way, the systems and methods disclosed herein will lead to a better, solid, and quality product for the end customer.

FIG. 1 shows an example schematic of an example system 100 consistent with embodiments disclosed herein. As shown in FIG. 1, system 100 may include may include a processing unit 102 and a memory 104. The memory 104 may include a software module 106, process flows 108, test narratives 110, and report card data 112. While executing on processing unit 102, software module 106 may perform processes for testing process flows 108, including, for example, one or more stages included in a method 200 described below with respect to FIG. 2.

As disclosed herein, process flows 108 may include instructions or other commends that may be executed by a self-service terminal or other POS device. For example, during a checkout operation, a user of a POS device may proceed through various stages of a transaction. The various stages may be represented via screens, menus, and/or other prompts for a user. For instance, a first stage of a process flow may be for a user to scan items. Once the items are scanned a second screen may appear that presents a menu for the user to select a form of payment. Once the form of payment is selected, another screen may be presented to accept the payment. Examples of process flows may include paying for items, returning items, product lookup, price checking items, maintenance tasks, etc.

Test narratives 110 may include test scripts or other protocols for testing the process flows. Test narratives 110 may include scripts written in a compiled or interpreted language. The scripts may be executed by processing unit 102. During executing, test narratives 110 may test one or more paths that a user of a POS system may follow when using the POS system. Stated another way, test narratives 110 may follow one or more of process flows 108. For example, test narratives 110 may define selections from menus and expected responses from the POS system when following process flows 108.

In addition to defining paths of process flows, test narratives 110 may include expected responses and code to record parameters and responses from the POS system. For example, when a user makes a selection to make a payment, the response from the POS system may be to active a card reader. Thus, part of test narratives 110 may include code that records the response from various sensors within the POS system. One of the sensors may be a response from or s signal sent to a card reader. In other examples or in addition to, part of the test narratives 110 may include recording which menu is selected and displayed when a selection is made from a first menu. For instance, when a user makes a selection from a first menu, such as a payment selection menu, a second menu, such as a listing of accepted forms of payment, may be displayed.

Test narratives 110 may also include responses when errors or other unexpected results are obtained. For example, when an error occurs, such as getting an unexpected result, test narratives 110 may include what data to collect that resulted in the error. For instance, when an error is encountered test narratives 110 may include scripts that record portions of code being executed by the POS system that resulted in the error. As a result, when an error is encountered, a programmer or other technician may be able to identify source code from the POS that may need to be examined for bugs.

Report card data 112 may include the results obtained from executing test narratives 110. For example, report card data 112 may include pass/fail indications for each of test narratives 110. For instance, when test narratives 110 are executed, a simple pass/fail indication may be recorded for each path of process flows 108 followed. Report card data 112 may also include recording which flows from process flows 108 are tested and which are not tested in addition to the results of the test. Report card data 112 may include data that may be used to form a coverage map as disclosed herein. Report card data 112 may include a listing of process flows 108 that were tested and passed, tested and failed, and/or not tested.

System 100 may include a user interface 114. User interface 114 may include a keypad, a display (touchscreen or otherwise), etc. In addition, user interface 114 may include audio equipment such as speakers, a microphone, a headphone jack, etc. that may be used to allow a user to interface with system 100.

System 100 may also include a communications port 116. Communications port 116 may allow system 100 to communicate with various information sources, such as, but not limited to, remote computing devices such as servers, bank teller computers, self-service terminals, automated teller machines, etc. As disclosed herein, communications port 116 may be wired or wireless. Non-limiting examples of communications port 116 include, Ethernet cards (wireless or wired), Bluetooth® transmitters and receivers, near-field communications modules, serial port interfaces, etc.

System 100 may also include an input/output (I/O) device 118. I/O device 118 may allow system 100 to receive and output information. Non-limiting examples of I/O device 118 may include, a camera (still or video), a printer, a scanner, biometric readers, a scale, sensors that may be coupled to or installed in self-service terminals, etc.

Figure 2:
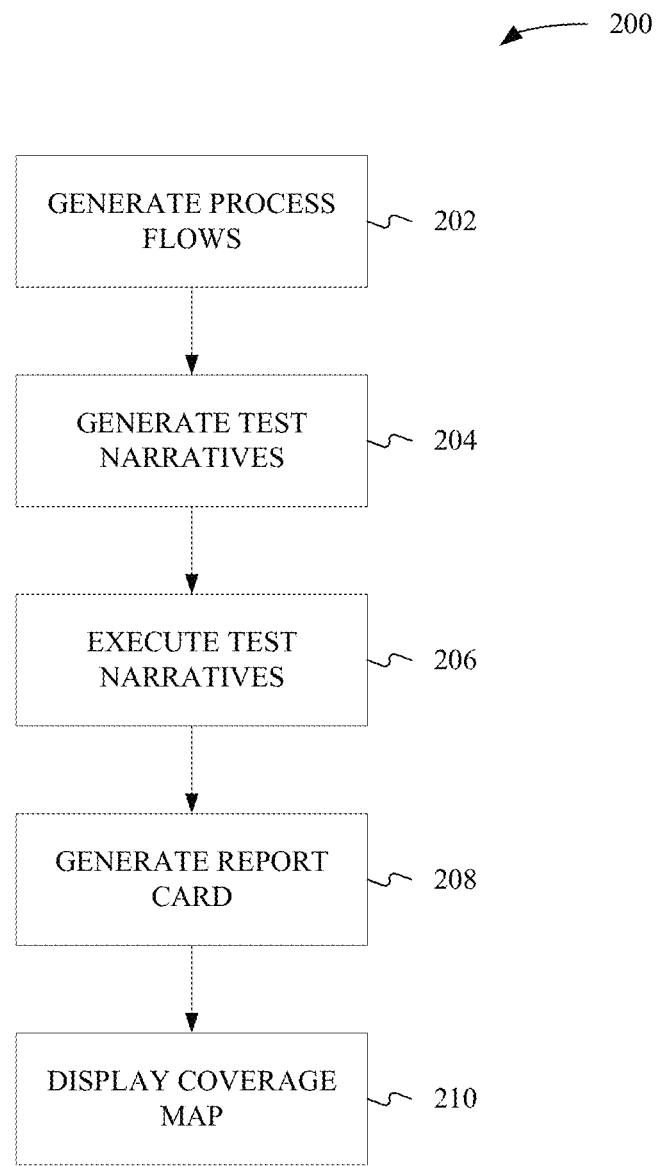
FIG. 2 shows a flowchart for an example method consistent with embodiments disclosed herein.

FIG. 2 shows an example method 200 consistent with embodiments disclosed herein. Method 200 may begin at stage 202 where process flows may be created. The process flows may be created separate from the POS system so that the process flows may be tested separate from the POS system. For example, the process flows may be created using system 100 and tested via system 100 before being sent to POS systems for actual deployment.

From stage 202, method 200 may proceed to stage 204 where test narratives may be generated. For example, using automation tools and/or script editors, one or more test scripts may be generated. The test scripts may be generated such that system 100 may act as a crawler. For example, instead of trying to program for every possible path that the process flows may take, test scripts may select different paths by selecting different menu selections and crawl through the various paths possible to traverse the various process flows generated in stage 202.

Generating the test narratives may also include defining reactions and data to be saved when errors or other unexpected results are obtained. For example, the test narratives may include expected results and when an unexpected result is obtained, the test scripts may define data to be collected and code being executed that resulted in the unexpected result as disclosed herein.

From stage 204 method 200 may proceed to stage 206 where the test narratives may be executed. For instance, once the test narratives are generated, system 100 may execute the test narratives as disclosed herein.

From stage 206 method 200 may proceed to stage 208 where a report card may be generated. The report card may include report card data 112 disclosed herein. The report card may include data that was recorded during executing of the test narratives during stage 206. Thus, stage 208, generating the report card, may be executed at the same time as stage 206. Generating the report card may include collecting data as disclosed herein. In addition, generating the report card may include printing test results or other data via I/O device 118 collected during execution of the test narratives.

Figure 3:
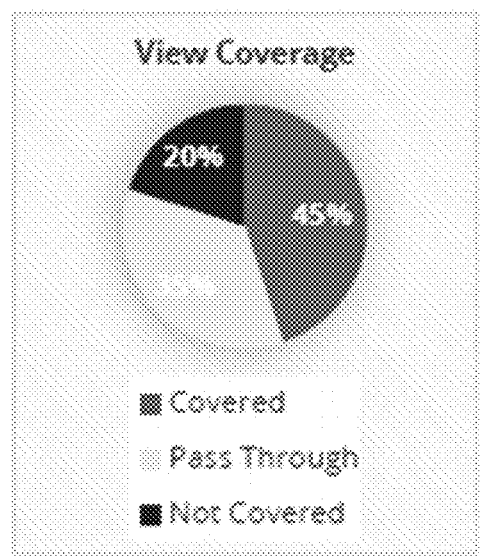
FIG. 3 shows an example report card consistent with embodiments disclosed herein.

From stage 208 method 200 may proceed to stage 210 where a coverage map may be displayed. For example, the report card may be displayed on user interface 114. For example, as shown in FIG. 3, displaying the report card may include displaying a pie chart that shows the number of possible flows covered, passed through, and not covered. For example, a test narrative consist of a test input, a test scenario, and an expected output. As shown in FIG. 3, "covered" may indicate a process flow was executed and its output inspection passed. "Pass-Through" may indicate a process flow was executed but no output inspection was made. "Not Covered" may indicted a process flow was never executed or perhaps it was executed but it failed output inspection.

Figure 4:
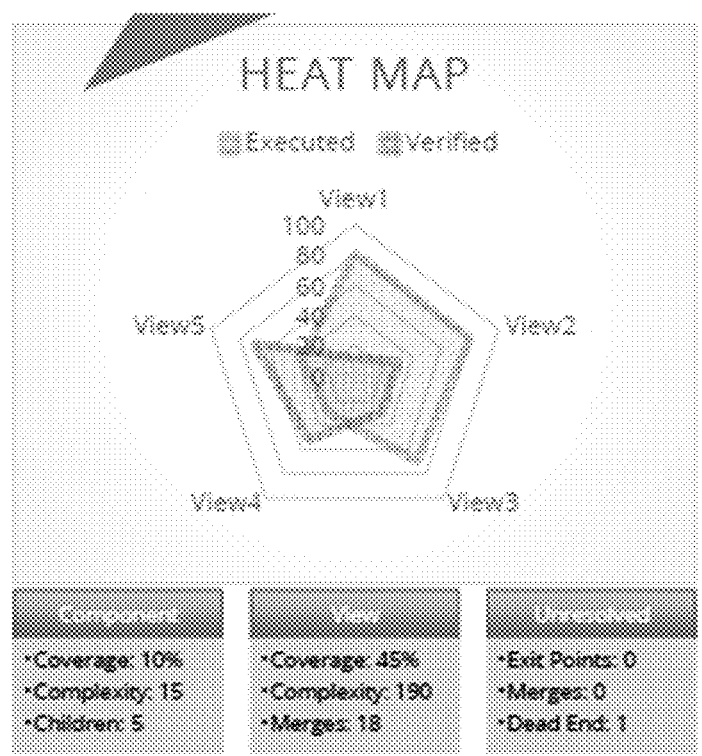
FIG. 4 shows an example report card consistent with embodiments disclosed herein.

As shown in FIG. 4, the report card may be displayed as a heat map. As shown in FIG. 4, "executed" may represent process flows that were executed but no output inspection made. "Verified" may represent process flows that were executed and their output was inspected and passed. In the heat map shown in FIG. 4, both executed and verified were collected with respect to the pass-through' and covered percentages on each view with respect to "view coverage" described below.

Views are basically named displays in the POS. For example, a sale view is a POS display that allows sold items to be added. While, a tender view is a POS display that allows tenders to be processed and therefore items can no longer be added at this point. The transition from sale view to tender view may be considered a process flow. A process flow may allow background execution of tasks before getting to the next display. Wiring and persisting the behavior of a process flow may be saved as another named view. This kind of view however does not require a physical input from the user—it just defines the transition from one display to another. So, in summary, a view can either be an actual display or a process flow that transitions from one display to another.

The "view coverage" report may contain the path percentage of "covered," "pass through," and "not covered" paths with respect to all available paths that can be executed within a view.

The "component" section of FIG. 4 may represent the modular separation of features, functions, and processes in the POS. For example, a POS can be broken down into major components like sale, tender, returns, manager override, discounts, item processing, etc. Each component may have their own process flows and displays to maintain. As such view coverage can be summarized or grouped per component.

"Component coverage" may mean the collective coverage of all view coverages. "Component complexity" may mean the collective complexity of all view complexity percentages. "Component children" may represent the number of sub-components that were invoked by the current component during its test.

"View coverage" may mean the path percentage of "covered" paths with respect to all available paths that can be executed within a view. "View complexity" may mean the cyclomatic complexity or the number of independent paths in a view. "View merges" may mean the number of intersecting paths in a view.

The "unresolved" section shown in FIG. 4 may describe the un-mapped exit points, merges, and dead-ends in a component or view. an exit point may allow a component to exit and report back to its parent component's process flow. If there are unresolved component exits, then it should be reported there. A merge may be an intersecting path in a view. If there are unresolved merges, then it should report it there as well. A dead end may be an unreachable path in a view. If there are unreachable paths, then it should report it there as well.

EXAMPLES

Example 1 is a method for texting a process flow, the method comprising: executing a test narrative to test the process flow; generating a report card based in accordance with the test narrative; and displaying, on a display, a coverage map based on the report card.

In Example 2, the subject matter of Example 1 optionally includes generating the test narrative.

In Example 3, the subject matter of Example 2 optionally includes wherein generating the test narrative includes generating one or more test scripts.

In Example 4, the subject matter of any one or more of Examples 1-3 optionally include wherein the report card includes a summary of results obtained from executing the test narrative.

In Example 5, the subject matter of Example 4 optionally includes wherein the results include pass/fail indications for each tests of the test narrative.

In Example 6, the subject matter of any one or more of Examples 1-5 optionally include wherein the coverage map includes a representation of items within the test narrative that were tested and passed, tested and failed, and not tested.

In Example 7, the subject matter of any one or more of Examples 1-6 optionally include generating the process flow.

Example 8 is a system for testing a process flow, the system comprising: a processor; and a memory storing instructions that, when executed by the processor, cause the processor to: execute a test narrative to test a process flow, generate a report card based in accordance with the test narrative, and display, on a display, a coverage map based on the report card.

In Example 9, the subject matter of Example 8 optionally includes wherein the instructions, when executed by the processor, further cause the processor to generate the test narrative.

In Example 10, the subject matter of Example 9 optionally includes wherein generating the test narrative includes additional instructions that, when executed by the processor, cause the processor to generate one or more test scripts.

In Example 11, the subject matter of any one or more of Examples 8-10 optionally include wherein the report card includes a summary of results obtained from executing the test narrative.

In Example 12, the subject matter of Example 11 optionally includes wherein the results include pass/fail indications for each tests of the test narrative.

In Example 13, the subject matter of any one or more of Examples 8-12 optionally include wherein the coverage map includes a representation of items within the test narrative that were tested and passed, tested and failed, and not tested.

In Example 14, the subject matter of any one or more of Examples 8-13 optionally include wherein the instructions, when executed by the processor, further cause the processor to generate the process flow.

Example 15 is a system for testing a plurality of process flows, the system comprising: a processor; and a memory storing instructions that, when executed by the processor, cause the processor to: generate the plurality of process flows, each of the process flows corresponding to a workflow executed on a point of sale device, generate a plurality of test narratives, each of the test narratives corresponding to at least one of the plurality of process flows, execute the plurality of test narratives, generate a report card based in accordance with the plurality of test narratives, and display, on a display, a coverage map based on the report card.

In Example 16, the subject matter of Example 15 optionally includes wherein generating the test narrative includes additional instructions that, when executed by the processor, cause the processor to generate one or more test scripts for each of the plurality of test narratives.

In Example 17, the subject matter of any one or more of Examples 15-16 optionally include wherein the report card includes a summary of results obtained from executing the plurality of test narratives.

In Example 18, the subject matter of Example 17 optionally includes wherein the results include pass/fail indications for each of the test narratives.

In Example 19, the subject matter of Example 18 optionally includes wherein the instructions, when executed by the processor, further cause the processor to map each of the pass/fail indications for each of the test narratives to a process control center.

In Example 20, the subject matter of any one or more of Examples 15-19 optionally include wherein the coverage map includes a representation of items within the test narrative that were tested and passed, tested and failed, and not tested.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A method for testing a plurality of process flows, the method comprising:
   generating the plurality of process flows, each of the plurality of process flows corresponding to a workflow executed on a point of sale device;
   generating a plurality of test narratives, each of the test narratives corresponding to at least one of the plurality of process flows;
   executing the plurality of test narratives to test each of the process flows;
   generating a report card based in accordance with the plurality of test narratives, the report card including a summary of results that include pass/fail indications for the each of the test narrative obtained from executing each of the test narratives;
   displaying, on a display, a coverage map and a heat map based on the report card, the coverage map displaying percentages of paths covered, passed through, and not covered, the heat map including a listing of views corresponding to named displays on a point of sale terminal, and
   mapping each of the pass/fail indications for each of the test narratives to a process control center,
   wherein:
      a path covered includes a process flow that was executed with an output inspection passed,
      a path that is passed through includes a process flow that was executed without an output inspection being made, and
      a path that was not covered includes a path that was never executed or executed with a failed output inspection.

2. The method of claim 1, wherein generating the test narrative includes generating one or more test scripts.

3. The method of claim 1, wherein the coverage map includes a representation of items within the test narrative that were tested and passed, tested and failed, and not tested.

4. A non-transitory computer readable medium for testing a plurality of process flows, the non-transitory computer readable medium storing instructions that, when executed by the processor, cause the processor to:
   generate the plurality of process flows, each of the plurality of process flows corresponding to a workflow executed on a point of sale device;
   generate a plurality of test narratives, each of the test narratives corresponding to at least one of the plurality of process flows;
   execute each of the test narratives to test each of the process flows;
   generate a report card based in accordance with the plurality of test narratives, the report card including a summary of results that include pass/fail indications for each of the test narratives obtained from executing the plurality of test narratives;
   display, on a display, a coverage map and a heat map based on the report card, the coverage map displaying percentages of paths covered, passed through, and not covered, and the heat map including a listing of views corresponding to named displays on a point of sale terminal; and
   map each of the pass/fail indications for each of the test narratives to a process control center,
   wherein:
      a path covered includes a process flow that was executed with an output inspection passed,
      a path that is passed through includes a process flow that was executed without an output inspection being made, and
      a path that was not covered includes a path that was never executed or executed with a failed output inspection.

5. The non-transitory computer readable medium of claim 4, wherein generating the test narrative includes additional instructions that, when executed by the processor, cause the processor to generate one or more test scripts.

6. The non-transitory computer readable medium of claim 4, wherein the coverage map includes a representation of items within the test narrative that were tested and passed, tested and failed, and not tested.

7. A system for testing a plurality of process flows, the system comprising:
   a processor; and
   a memory storing instructions that, when executed by the processor, cause the processor to:
      generate the plurality of process flows, each of the process flows corresponding to a workflow executed on a point of sale device,
      generate a plurality of test narratives, each of the test narratives corresponding to at least one of the plurality of process flows,
      execute the plurality of test narratives,
      generate a report card based in accordance with the plurality of test narratives, the report card including a summary of results that include pass/fail indications for each of the test narratives obtained from executing the plurality of test narratives,
      display, on a display, a coverage map and a heat map based on the report card, the coverage map including percentages of paths covered, passed through, and not covered, the heat map including a listing of views corresponding to named displays on a point of sale terminal, and
      map each of the pass/fail indications for each of the test narratives to a process control center,
   wherein:
      a path covered includes a process flow that was executed with an output inspection passed,
      a path that is passed through includes a process flow that was executed without an output inspection being made, and
      a path that was not covered includes a path that was never executed or executed with a failed output inspection.

8. The system of claim 7, wherein generating the test narrative includes additional instructions that, when executed by the processor, cause the processor to generate one or more test scripts for each of the plurality of test narratives.

9. The system of claim 7, wherein the coverage map includes a representation of items within the test narrative that were tested and passed, tested and failed, and not tested.

* * * * *